Nov. 24, 1970 E. MINTZ 3,542,939
SHIELDING AND SEALING GASKET MATERIAL AND METHODS
OF FABRICATING IT
Filed Oct. 28, 1968 2 Sheets-Sheet 1

INVENTOR.
EZRA MINTZ
BY Lindenberg & Freilich
ATTORNEYS

Nov. 24, 1970           E. MINTZ           3,542,939
      SHIELDING AND SEALING GASKET MATERIAL AND METHODS
                         OF FABRICATING IT
Filed Oct. 28, 1968                        2 Sheets-Sheet 2

INVENTOR.
EZRA MINTZ
BY Lindenberg & Freilich
                ATTORNEYS

United States Patent Office 3,542,939
Patented Nov. 24, 1970

3,542,939
SHIELDING AND SEALING GASKET MATERIAL AND METHODS OF FABRICATING IT
Ezra Mintz, 6124 S. Bedford Ave.,
Los Angeles, Calif. 90056
Filed Oct. 28, 1968, Ser. No. 771,142
Int. Cl. B65d 53/00; H05k 9/00
U.S. Cl. 174—35                    6 Claims

ABSTRACT OF THE DISCLOSURE

A new shielding and sealing gasket material which comprises parallel, spaced apart continuously corrugated, electrically conductive wires which are supported in a homogeneous resilient body of material. Each wire defines a longitudinal axis extending between its opposite ends, with successive corrugations extending on opposite sides of the axis. The number of corrugations per inch and the corrugations' peak to peak spacing being easily variable. The method for producing the material includes the steps of forming a stack of sheets of plastic resilient material, with a separate plurality of parallel, spaced apart continuously corrugating wires between adjacent sheets, followed by a step of bonding the sheets together to form a homogeneous resilient body of material.

BACKGROUND OF THE INVENTION

Field of the invention

The present invention relates to shielding and sealing gasket material and, more particularly, to a new type of material and to improved methods of manufacturing the material to form gaskets, which effectively prevent electrical energy from escaping joined enclosed containers, and which at the same time, provide a liquid or gas tight sealing therebetween.

Description of the prior art

The usefulness and advantages of gaskets, which are capable of providing both electrical shielding, by preventing electrical shielding, by preventing electrical energy, such as in the radio frequency (RF) range, fro escaping joined enclosed containers, thereby providing RF shielding, and at the same time providing a liquid or gas tight seal at said joints are well known.

A considerable number of different types of gasket materials, capable of providing both electrical shielding and sealing properties, have been devised and are commercially available.

One type, which theoretically provides superior properties is shown and described in U.S. Pat. No. 2,885,459. In said type, shielding, suppressing the escape of RF energy at the joints, as well as suppressing radio noise, is achieved by providing a gasket material comprising a multiplicity of small wires, insulated from one another in parallel alignment in a resilient rubber type material. The ends of the wires, which are exposed on opposite sides of a gasket, made from such a material, engage the mating surfaces to be joined, thereby providing electrical conductivity therebetween, in a direction perpendicular to the mating surfaces, while the resilient material between the joint surfaces provides the gas tight seal therebetween. Pat. No. 2,885,459 also teaches two methods of manufacturing such gasket material.

The limitations of the teachings in Pat. No. 2,885,459 are discussed in U.S. Pat. No. 3,126,440, particular attention being directed to column 2, lines 1–36. As pointed out therein, the methods of Pat. No. 2,885,459 are impractical since the wires, with the single angle bend, tend to rotate in the rubber material during a cutting step. Other disadvantages of the methods taught in Pat. No. 2,885,459 are the minimum gasket thickness which can be produced by such methods, the dependency of gasket thickness on wire size, and the limited number of wires per square inch in the finished gasket.

In Pat. No. 2,885,459 (column 4, lines 63–72) it is stated that by said methods a gasket 1/8" thick with 500 wires per square inch was produced with each wire .005" in diameter while a 1/4" thick gasket with the same number of wires per square inch was produced with each wire 0.020" in diameter. Thus, it is apparent, that the gasket thickness controls the wire size, a limitation which is not unreasonable, in the methods taught therein, since the wires have to be driven through the rubber material, necessitating thicker wires for thicker rubber material. The number of 500 wires per square inch is apparently the upper limit producible with the taught methods even though patentee states that the wire density may be varied depending upon shielding requirements. It is submitted by the methods taught in Pat. No. 2,885,459, that the wire density may be made less than 500 wires per square inch but not much above it.

Another method of manufacturing a very similar type of gasket material is described in U.S. Pat. No. 3,126,440. The method described therein is claimed by its inventor to provide advantages over the methods described in the earlier issued patent (No. 2,885,459). Basically, the method taught in Pat. No. 3,126,440 is described in conjunction with FIGS. 1, 2, 8 and 9 therein, and the description starting on column 2, line 55 and continuing to column 4, line 18. As is apparent from the teachings therein, the method comprises spirally winding a metallic wire on a cylindrical bar of a resilient plastic substance and, thereafter, coating the wound bar with a layer of plastic material, followed by successive windings of additional wire and coating of additional layers of resilient plastic material. Thereafter, the entire assembly is cured, followed by a step in which it is machined on two sides, parallel to each other, to thus expose opposite ends of wires in the cured resilient rubberized material.

A major disadvantage of such a method is the need to machine the cured multi-layered wound material on opposite sides thereof. This step, in addition to resulting in loss of a substantial amount of material, thereby increasing the overall cost of the manufactured gasket, also involves machining cured wires within a rubberized material which are likely to be dislodged or displaced, thereby increasing the likelihood of conduction therebetween, which may affect the desired RF shielding. Also, the single curvature in each wire (see FIG. 9 of No. 3,126,440) is not uniform. Rather, it decreases the farther the wires are from the central bar 1. In any gasket material of any reasonable width, the wires farthest from bar 1 are practically straight.

Another disadvantage of this prior art method is the absence of wires extending in the finally manufactured gasket in the space occupied initially by the circular central bar. This is particularly apparent from FIGS. 2, 8 and 9 of Pat. No. 3,126,440. The absence of such wires from this portion of the gasket cannot be overcome by initially using a circular bar of a very small diameter, since if such a bar were used, several of the wire loops about such a small diameter bar would not be exposed on opposite sides of any gasket of significant thickness. From an RF shielding point of view, the absence of exposed wires would be most detrimental.

In an apparent attempt to overcome the disadvantages of the methods hereinbefore described, the patentee of Pat. No. 3,126,440 discloses a gasket material in which woven material is incorporated. This embodiment is described in said patent, particular attention being directed to column 4, lines 19–75, and FIGS. 3–6 and 10. The essential feature of the woven material is that the warp is made of non-metallic non-conductive strands while the woof is made of metallic conductive wires such as stainless steel. The function of the warp is to hold the woof or conductive wires in place and as stated therein, "to give the proper curvature to the woof wires, the purpose being to make the entire gasket resilient so that heavy bolt pressure on the flanges will not be required."

Although from a cursory review of the teachings, it may seem that the gasket material incorporating the woven material produces the desired results, a thorough study clearly reveals otherwise. For the warp strands to produce any meaningful curvature in the metallic woof wires which are either stainless steel or brass, i.e., of relatively low resiliency, it is necessary to use even less resilient warp strands and of significant diameters. Thus, to produce curvatures of corrugations about ±0.010″ with respect to the woof strands' longitudinal axes, namely, a spacing of about 0.020″ peak-to-peak between adjacent corrugations, hereafter also referred to as undulations, relatively stiff or non-resilient warp strands of at least 0.020″ in diameter have to be used. These strands must be relatively rigid and inflexible in order to produce the desired corrugations in the metallic woof strands. Otherwise, the corrugations would be produced during weaving, in the warp strands. Also, in order to have corrugated wires in relatively thin gaskets, for example 1/16″ thick, it is necessary to have a warp spacing of about 30 warp strands per inch, to insure sufficient curvature in each wire only 1/16″ in length. Consequently, with 30 warp strands per inch with each strand being of a diameter of 0.020″ a substantial portion of the gasket volume is occupied by inflexible warp strands.

These limited-resiliency wires greatly limit the overall resiliency or flexibility of the finished gasket in the direction of the warp strands (horizontal directions in FIGS. 3 and 6 of Pat. No. 3,126,440). Any attempt to increase the resiliency along the warp strands by reducing the diameters of the warp strands would result in a further reduction in the curvatures, produced in the woof strands, which is of major significance. Even with thinner warp strands and fewer warp strands per inch, the flexibility of fabricated gasket material in a direction along the warp strands has been found to be very limited. High flexibility is experienced only in a direction perpendicular to the warp strands (vertical direction in FIG. 10). This is due to the fact that the rubber material 6 is much more resilient than the warp strands.

Another major disadvantage of a gasket material incorporating the woven material is related to its non-electrical characteristics. This disadvantage may best be explained by first considering the process of producing the material. In order to use warp strands, made of nylon or any of the other materials, suggested by the patentee of Pat. No. 3,126,440, these strands must be in a fully cured state. Consequently, when layers of woven material are coated with the rubber-like resilient substance to form the gasket material body, the body is not homogeneous. Rather, the body consists of a body of resilient material in which are embedded electrically conductive wires, as well as clearly separable and distinguishable non-conductive warp strands of limited resiliency.

Very often, when cutting or slicing such a material to form a gasket of a desired thickness, warp strands are often exposed at the cut surfaces. They tend to and are easily separated from the resilient material to form irregular surfaces. Even when they are not separated, their mere exposure on the surfaces produces irregular non-uniform surfaces. Consequently, much higher forces must be applied to the surfaces between which a seal is to be formed, with the gasket therebetween. A further disadvantage of using a gasket material with exposable warp strands of nylon and the like, is the liquid absorption characteristic of such strands. For example, nylon strands or the like, tend to absorb water, or like liquids, up to a very significant percentage of their weight. Consequently, any gasket made of a material with nylon or warp strands or the like cannot be used satisfactorily to provide a liquid tight seal.

In addition to the aforementioned mechanical limitations of the woven-material-incorporating gasket material, it also has several electrical disadvantages. These include the limited maximum wire density which is achievable therewith. As pointed out in said Pat. No. 3,126,440, in column 4, lines 54–56, the minimum average distance between separate layers of warp wires of 1/16 of an inch. Adding thereto the thickness of the woven material of about 0.036″, (assuming warp strands of 0.024″ in diameter and woof wires of 0.0060″), the number of wires per inch in a direction across the woven materials is 10. Thus, even with a maximum of 35 woof wires per inch (column 4, line 30) the maximum density is 350 wires per square inch.

Even when assuming that the number of wires in a direction perpendicular to the woven layers is 16, which is the maximum contemplated in Pat. No. 3,126,440, the total number of wires per square inch is only 560 (35 × 16) which is significantly less than is generally desired for practical applications. Desired densities are generally above 700 wires, 900 being a more typical value for the desired number of wires per square inch. From the foregoing it should be appreciated that such a wire density is clearly unattainable with any of the methods herebefore taught.

Also, the non-uniform distribution of the wires, which characterizes the gasket material when the woven material is used in producing the gasket material, is highly undesirable, since it tends to polarize the gasket material, making it more sensitive to shielding in one direction than another. Furthermore, with a wire spacing of 16 wires per inch, in one direction, a gasket, cut from a material having such a wire spacing, may not produce sufficient shielding due to the absence of wires in gasket strips which are as wide as 1/16 of an inch.

These disadvantages can only be overcome by providing a new gasket material in which wires, with sufficient corrugations and sufficient in number per square inch are embedded in a homogeneous resilient rubber-like material, possessing uniform flexibility characteristics in all directions.

OBJECT AND SUMMARY OF THE INVENTION

It is a primary object of the present invention to provide a new improved gasket material of the type described herein.

Another object of the invention is to provide a new gasket material with corrugated wires in a homogeneous body of material.

Yet, another object of the present invention is to provide new, novel methods of manufacturing a new improved RF shielding and sealing gasket material.

A further object of the present invention is the provision of a method, involving a relatively small number of steps, to produce a new improved gasket material, in which a plurality of electrically conductive corrugated wires are parallely disposed in a homogeneous resilient rubberized material, with opposite ends of the wires, having spring-like properties, exposed at opposite surfaces of the finished gasket, in order to provide electrical conductivity between mating surfaces of a joint in which the gasket is to be used.

These and other objects of the preesnt invention are achieved by providing a novel method, which in one embodiment comprises the steps of supporting electrically conductive, continuously corrugated, spaced apart wires on a plurality of window-type frames. All the wires supported on each frame are parallelly supported thereon. The frames are then stacked with all the wires in the various frames in a parallel relationship, and with a sheet of resilient plastic substance, hereafter also referred to simply as a plastic sheet, on either side of each of the frames in order to provide insulation between wires supported on adjacent frames. The longitudinal axes of all the wires between the plastic sheets are in parallel alignment so that the axis of each wire points in the same direction. Each wire is continuously corrugated with adjacent corrugations being oriented on opposite sides of its longitudinal axis.

The number of corrugations per inch of length of the wire along its axis, and the heights of corrugations, hereafter also referred to as the corrugations' peaks, may be conveniently varied to meet a large range of practical requirements. Thereafter, the sheets of the resilient plastic material in the stack are bonded together, to form a homogeneous unitary resilient body in which the wires on the frames are supported in parallel alignment at opposite parallel sides of the unitary body. After the bonding operation the frames are removed. In another embodiment of the novel method, a continuously corrugated wire is simultaneously spirally wound on a plurality of plastic sheets, followed by covering the spirally wound wires with additional layers of plastic sheets after which the continuously corrugated wire is again spirally wound. Thus, stacks of plastic sheets, separated by pluralities of separated continuously corrugated wires are formed.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
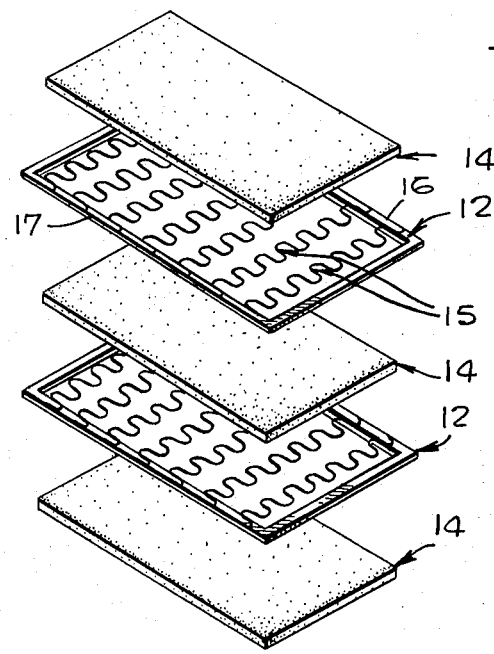
FIG. 1 is an expanded view of an assembly employed in one embodiment of the method in accordance with the teachings of the present invention.

Reference is now made to FIG. 1, which is an expanded view of a stack of elements, employed in one embodiment of the novel method of the present invention, in the manufacturing or making of the improved RF shielding and sealing gasket material. Therein, reference numerals 12 designate two identical window-type frames, separated by a sheet of resilient plastic material 14. Only two frames are shown to simplify the following description. Identical plastic sheets 14 are used above the top frame 12, between the frames, and below the bottom frame 12, so that each frame is disposed between two sheets of resilient plastic material in the stack. Each frame 12 fixedly supports a plurality of continuously corrugated electrically conductive wires 15, which are parallelly positioned on the frame and fixedly secured at the opposite parallel sides 16 and 17 thereof. The wires may be fixed to the frames' sides by soldering, welding or any other desired technique.

Figure 1A:
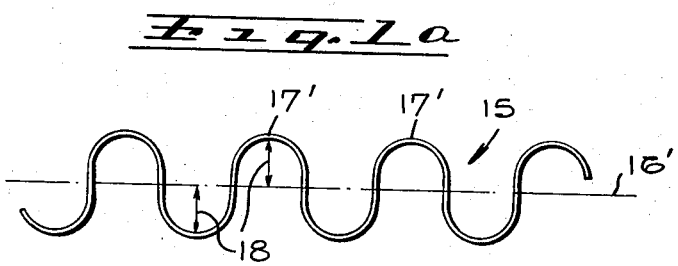
FIG. 1a is a side view of a typical continuously corrugated wire incorporated in the improved gasket material of the present invention.

As seen from FIG. 1a, in which a typical wire 15 is diagrammed, each wire 15 is continuously corrugated along its longitudinal axis 16' defining corrugated portions or corrugations 17' with peaks which are spaced from the longitudinal axis distances designated by arrows 18. Arrows 18 actually represent the corrugations' heights or peaks. The number of corrugations 17' per inch along the wire axis 16' and the heights of the corrugations are easily controllable, as will be pointed out hereafter in detail. It should be pointed out that the wires 15 are not restricted by warp type strands of limited resiliency, but rather are freely supported on the frame 12.

Since each frame is of the window-type, each of the wires 15 which is supported thereon, is exposed on either side (top and bottom) thereof except for its ends, at which the wire is fixed to the frame. Consequently, when the frames are stacked together, with the plastic sheets 14 therebetween, each wire is secured between two adjacent sheets of plastic material, which insulates it from wires in adjacent frames. The wires on each frame are insulated from one another due to their parallel alignment thereon. The spacing between wires 15 is at least equal to the peak to peak distance between successive corrugations in any wire. Also, the thickness of each plastic sheet 14 is at least equal to twice the corrugation height. In practice when the stack is formed the wires tend to become embedded in the sheets 14 so that the height of the stack is actually equal to the total thickness of all the plastic sheets.

After the stack is formed, a bonding step is performed, at the end of which the sheets 14 are all bonded together to form a homogeneous unitary resilient body of material, in which wires 15 extend from one side of the body to the other, with all wires being parallelly aligned while being insulated from one another.

Figure 2:
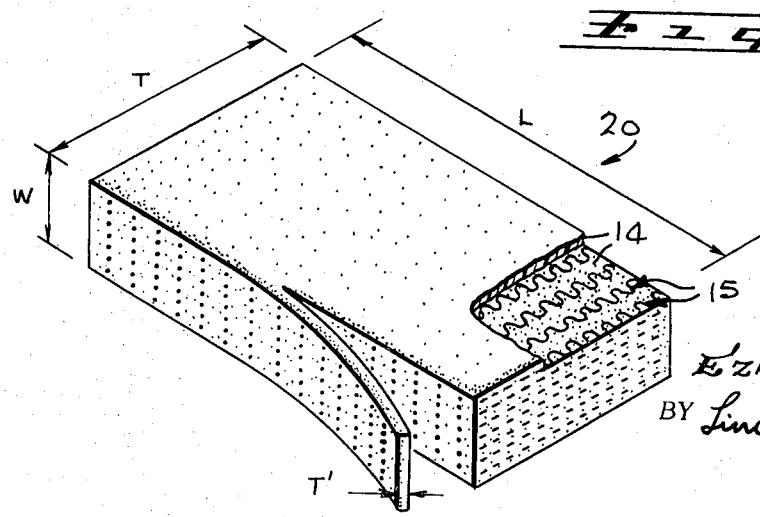
FIG. 2 is an isometric view of a block of gasket material made in accordance with the teachings of the present invention.

FIG. 2 to which reference is made herein, represents such a homogeneous body of gasket material, designated by numeral 20. In FIG. 2, the window frames 12 are not shown. The frames are removed after the bonding step, since after the homogeneous body 20 is formed, the wires 15 remain secured in their relative positions within the resilient body, and the frames are no longer necessary to maintain them in proper parallel alignment. It is apparent, that the length L of body 20 is a function of the initial length of the frames 12 and the plastic sheets 14, the height or width W of body 20 is primarily a function of the total thickness of all of plastic sheets 14, while the thickness T of body 20 is a function of the width of each of frames 12. After body 20 is formed, it may be machined, such as by cutting to form strips of preselected thicknesses, such as T', which may then be cut lengthwise and widthwise to form gaskets of desired dimensions.

It should be pointed out that the primary characteristic of each of corrugated wires 15 is that it provides electrical conduction between two mating surfaces with which its opposite ends, exposed on opposite parallel sides of the gasket material, may come in contact. The other desired characteristic of the corrugated wire is that it has spring-like properties, achieved by the continuous sequence of corrugations formed therein. The type of wire, as well as its thickness or circular dimension are subject to the designer's choice. For example, wires made of Monel, copper, stainless steel, aluminum or the like may be employed. Also, if desired, wires exhibiting high permeability characteristics may be used to provide magnetic shielding properties. In one application a high permeability wire which was copper clad and tin plated was used. The copper provided the electrical conductivity and the tin plated provided corrosion resistance properties. Gold plated wires may also be used to further enhance electrical conductivity.

Also, the thickness of each of plastic sheets 14, as well as the spacing between adjacent wires on the same frame, two variables which control the number of exposed wires per square inch of the gasket, are also subject to the designer's choice. Likewise, the particular substance of which plastic sheets 14 are formed is subject to choice, depending on the particular desired bonding process to be employed in bonding the sheets together to form the homogeneous unitary resilient body 20.

Sheets 14 are preferably uncured or semicured silicone rubber which, when cured, forms a homogeneous resilient rubber-like body. Sheets of neoprene or other elastomers may similarly be used.

As an example, rather than as a limitation of the invention, the method of the present invention, is successfully employed with plastic sheets of uncured silicone rubber of a thickness in the range of 0.025 inch, and with wires in the range of several thousandths of an inch in diameter, typically 0.005" with about 25 corrugations per inch and corrugation heights of about 0.010". The spacing between wires 15 on each frame is typically in the range of 30 wires per inch of frame length. The stack of silicone rubber sheets is then subjected to a curing process in which the silicone rubber of the various plastic sheets is cured to form the homogeneous resilient body 20.

In various embodiments of the invention, actually reduced to practice, the corrugations' peaks or heights varied from less than 0.010" with as many as 50 corrugations per inch, to peaks of 0.040" or more with 15 corrugations per inch. Wires with about 30 corrugations per inch with peaks of at least 0.012" have been found to produce a gasket material from which gaskets only 0.035" thick may be formed. Due to the continuous corrugations of the wires, the wires do not tend to be pulled out during slicing, nor do the wires turn within the resilient body to make contact with other wires.

Since in accordance with the present invention, separate non-woven wires are employed, the wire density is a function of the spacing of the wires on each of the frames and the thicknesses of the plastic sheets 14. With sheets 0.030" thick and wire spacings of 30 wires per inch a wire density of 900 wires per inch is easily achieved. It should be pointed out that in addition to the high wire density the wires are uniformly distributed in both perpendicular or orthogonal directions in the opposite sides of the homogeneous body at which the wires are exposed. Thus, gaskets produced from such a material are not polarized—a most desirable property. It should be pointed out that with sheets 0.030" thick the corrugations' peak-to-peak distance may approach 0.030".

Clearly, with corrugation's peak-to-peak distances which are significantly less than 0.030" the spacing between wires may be reduced below 0.030" to provide even higher wire densities than 900 wires per square inch. Generally stated, the spacing between wires should be greater than twice a corrugations' height and typically less than 5 times such a height. However, if desired, the spacing between wires may exceed 5 times the height of a typical corrugation.

Figure 3:
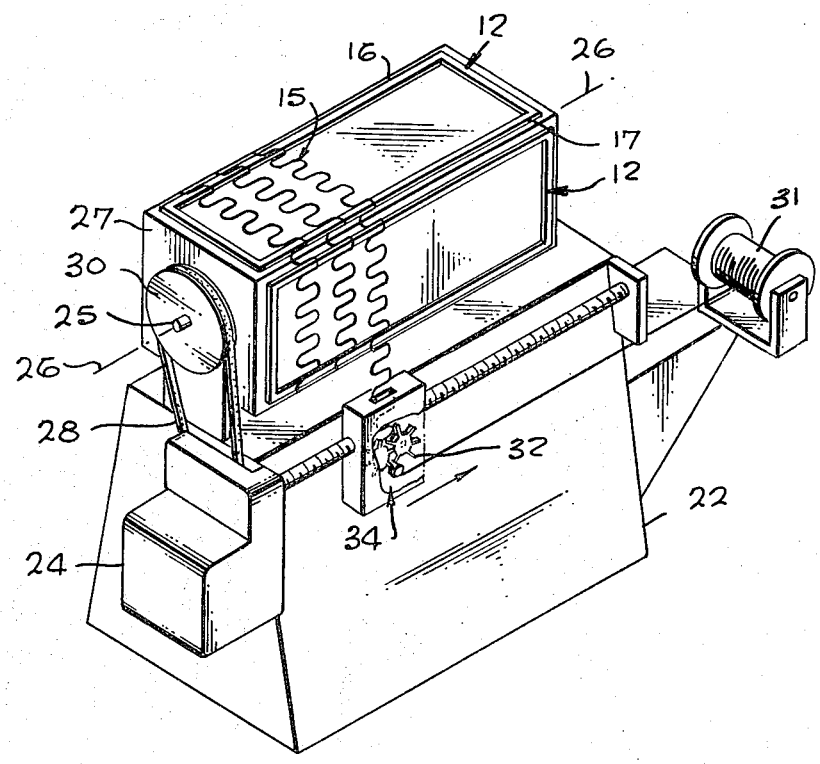
FIG. 3 is a combination block and isometric view of an arangement useful in performing one of the steps of one of the methods disclosed herein.

Reference is now made to FIG. 3 which is a combination perspective and block diagram of one arrangement, used to fixedly support wires on a plurality of frames, which are thereafter stacked to form the gasket material, as hereinbefore explained. Therein, elements, identical with those previously described, are designated by like numerals. The arrangement in FIG. 3 is assumed to comprise a base structure 22, which houses a source of power 24. The function of source 24 is to provide rotational power to rotate a shaft 25 about its longitudinal axis 26, which also defines an axis of rotation. Source 24 is coupled to shaft 25 by means of a belt 28 which is wound about a pulley 30 mounted on shaft 25.

In operation, a plurality of empty frames 12, for example, four frames, are fixedly positioned on a mandrel 27 through which shaft 25 extends. The sides 16 and 17 of each frame are parallelly aligned with the shaft 25 or axis 26. Thereafter, source 24 provides power to rotate the shaft 25 about its longitudinal axis, while a continuously corrugated wire is wound on the four frames, which rotate about axis 26. The continuously corrugated wound wire forms a multiconvolution helix, whose longitudinal axis is aligned with axis 26. The spacing between convolutions is controlled to define the desired spacing between wires in the finished product.

To form the continuously corrugated wire, conventional non-corrugated wire is supplied to the rotating frames from a spool 31 through a pair of meshed gears 32 which together form a novel continuously corrugated wire-forming unit. The corrugations are formed as the wire is pulled through the teeth of the gears. The corrugated wire is wound on the frames after passing a laterally moving feed member 34 whose rate of lateral movement and the rate of rotation of the shaft 25 control the spacing between wires. It should be appreciated that the corrugations' peaks are a function of the working depths of the teeth of the gears, while the number of corrugations per inch is a function of the number of teeth per gear and its pitch diameter. Due, however, to the wire's resiliency, the corrugations' peaks, and their number per inch, are also a function of the winding tension as a result of which the corrugated wire, after passing through gears 32 tends to stretch, resulting in a reduction in the number of corrugations per inch and particularly in their heights. If desired, this effect may be eliminated by driving the gears with appropriate means (not shown) rather than cause the gears to rotate by the wire which is pulled therethrough.

After the wire winding step, the wires supported by each frame and in contact with its opposite sides 16 and 17, are fixedly secured to the frame's sides, for example, by soldering or spot welding. Thereafter, the wire portions extending between frames are cut, to enable the removal of each frame and the wires fixedly supported thereon from the mandrel 27. Then, the stacking step is performed, followed by the other steps, previously described, in order to produce the desired gasket material.

Figure 4:
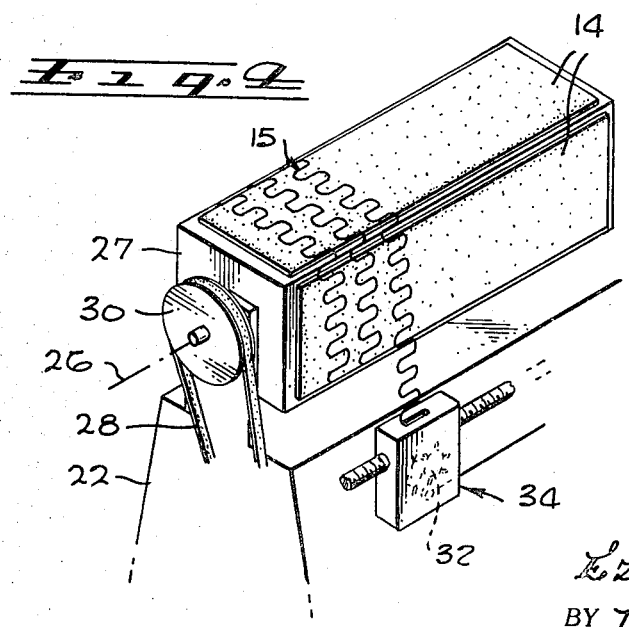
FIG. 4 is a combination block and isometric view of an arrangement useful in performing one of the major steps in another embodiment of the novel method disclosed herein.

In a preferred embodiment of the invention the need for the frames 12 is eliminated by winding the wires directly on plastic sheets 14 which are placed on the mandrel 27, as shown in FIG. 4, to which reference is made herein. After traversing the length of the plastic sheets 14, the wires are covered with additional plastic sheets 14 and the wire winding process is repeated. After each of the stacks on the mandrel reaches a desired height, the wires extending between stacks are severed and the stacks of the plastic sheets with the wires therebetween are then removed from the mandrel 27 to undergo the curing step.

Although particular embodiments of the invention have been described and illustrated herein, it is recognized that modifications and variations may readily occur to those skilled in the art and, consequently, it is intended that the claims be interpreted to cover such modifications and equivalents.

What is claimed is:

1. A shielding and sealing gasket material consisting of:
   a homogeneous body of material having first and second opposite sides and exhibiting equal resiliency in substantially all direcitons in a plane parallel to said sides; and
   a plurality of separate electrically conductive wires, each wire defining a longitudinal axis extending between said first and second opposite sides of said body of material with first and second ends of each wire exposed at said first and second sides respectively, each wire being continuously corrugated along its axis with successive corrugations being substantially on opposite sides of said axis.

2. The gasket material as defined in claim 1 wherein the number of wires exposed at either said first side or said second side is greater than 700 wires per square inch.

3. The gasket material as defined in claim 1 wherein the height of each corrugation is not less than 0.010 inch and the number of corrugations per inch along the wires' longitudinal axis is not less than 15.

4. The gasket material as defined in claim 1 wherein the wire density at each of said sides is not less than 600 with the wires being substantially uniformly distributed in two orthogonal directions in each side.

5. The gasket material as defined in claim 1 wherein the corrugations' heights are in the range of 0.010 inch and the spacing between wires in each of two orthogonal directions perpendicular to the wires' longitudinal axes is in the range of 0.030 inch.

6. The gasket material as defined in claim 1 wherein said corrugation heights are in the range of $n$ inch, $n$ being not less than 0.010 inch and the spacing between the longitudinal axes of adjacent wires in either of the two orthogonal directions is in the range of $2n$ to $5n$.

References Cited

UNITED STATES PATENTS

| 2,885,459 | 5/1959 | Pulsifer et al. | 174—35.2 |
| 3,126,440 | 3/1964 | Goodloe | 174—35.2 |

DARRELL L. CLAY, Primary Examiner

U.S. Cl. X.R.

267—272; 277—235